Figure 1:
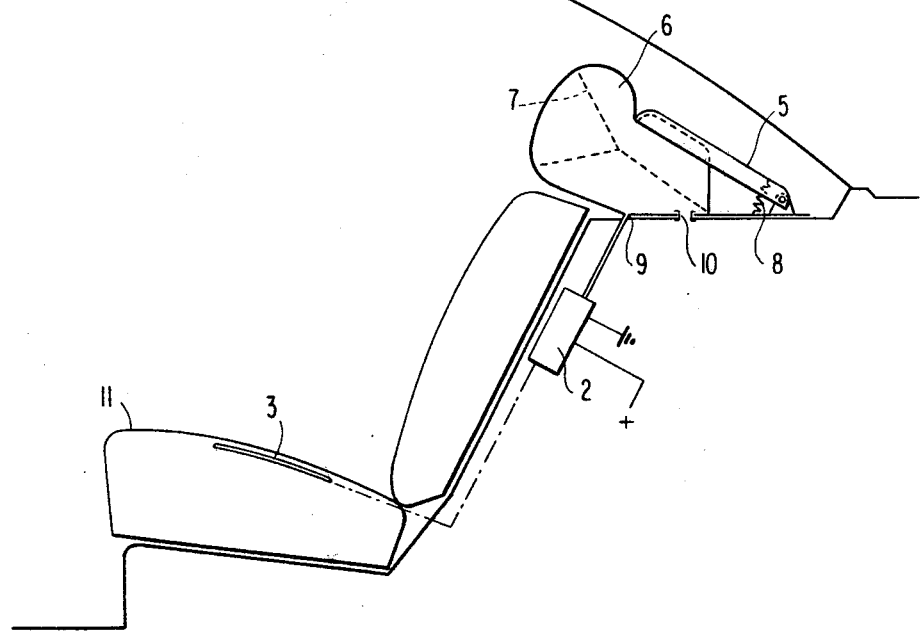

United States Patent [19]

Andres et al.

[11] 4,123,104
[45] Oct. 31, 1978

[54] HEADREST FOR A MOTOR VEHICLE

[75] Inventors: Rudolf Andres, Sindelfingen; Gerhard Busch, Gechingen; Werner Heiss, Doffingen, all of Germany

[73] Assignee: Daimler-Benz Aktiengesellschaft, Germany

[21] Appl. No.: 829,712

[22] Filed: Sep. 1, 1977

[30] Foreign Application Priority Data

Sep. 7, 1976 [DE] Fed. Rep. of Germany ....... 2640163

[51] Int. Cl.² ............................................... A47C 1/10
[52] U.S. Cl. ..................................... 297/391; 297/216
[58] Field of Search ....................... 280/728, 730, 736; 297/216, 391, 410

[56] References Cited

U.S. PATENT DOCUMENTS

| 3,510,150 | 5/1970 | Wilfert | 297/391 X |
| 3,703,313 | 11/1972 | Schiesterl et al. | 297/391 |
| 3,779,577 | 12/1973 | Wilfert | 280/730 |

FOREIGN PATENT DOCUMENTS

| 2,149,268 | 4/1973 | Fed. Rep. of Germany | 280/736 |
| 2,305,150 | 3/1976 | France | 297/410 |

*Primary Examiner*—James C. Mitchell
*Attorney, Agent, or Firm*—Craig & Antonelli

[57] ABSTRACT

A headrest for a motor vehicle in which an inflatable bellows forms the headrest which is provided with elastically yielding drawbands that return the bellows into its folded-together position when the bellows is deflated by withdrawing therefrom the pressure.

9 Claims, 2 Drawing Figures

U.S. Patent        Oct. 31, 1978        4,123,104

HEADREST FOR A MOTOR VEHICLE

The present invention relates to a headrest for a motor vehicle with an inflatable bellows which is inflated only in case of need.

Headrests impair the vision for the vehicle driver; consequently, they should disappear out of the field of vision of the driver with non-occupied vehicle seats. In order to achieve this, various solutions are known in the prior art, for example, the pivoting-away of the headrests or the retraction thereof into the backrests. Both measures require high mechanical expenditures, a large amount of space for the lowering and/or the pivoting-away and also a high kinematic expenditure for the movement of the headrests. A headrest is also described in the German Offenlegungsschrift No. 24 47 874 which is being extended by means of two bellows. One of the two bellows is thereby arranged in the seat and the other below the headrest. The system is not satisfactory because the extension of the headrest is uncertain for numerous reasons and requires itself constructive measures at the backrest.

It is the aim of the present invention to mount a headrest without change of the seating installation and to avoid thereby the aforementioned disadvantages. This aim is realized according to the present invention with the aid of an inflatable bellows, by means of which a non-existing headrest is created only in case of need.

The solution of the underlying problems resides according to the present invention in that the inflatable bellows itself forms the headrest which is provided with elastically yielding drawbands which return the bellows into a folded-together position during the withdrawal of the pressure. The inflation and the deflation of the bellows of the headrest is thereby to take place automatically or manually. For that purpose, the interior space of the bellows is brought into communication with an air pump which can be used both for the inflation as well as for the sucking-off of the bellows by the shifting of a four-way valve. For the automatic actuation of the air pump, the electric motor driving the air pump is switched on and off by a seat contact switch. The turning off of the electric motor can take place by an overload switch, whence it is possible to actuate the headrest completely automatically, i.e., as soon as a person occupies the corresponding seat, the associated headrest is inflated. Once the seat place is again cleared, the pump is used by a simple shifting operation for the purpose of emptying out or deflating the bellows of the headrest. The overload switch assures in every case the turning off of the electric motor at the given instant.

As to the rest, the bellows may be provided with a safety valve which, in case of a sudden, strong head impact, permits the escape of a part of the air out of the bellows. Constructively, the headrest is appropriately so constructed that the entire headrest unit, in addition to the bellows with accessories includes a base frame and a cover which covers off the folded-together bellows and is brought into the covering position by a spring. This cover can additionally be used also by a suitable constructive configuration of the bellows to additionally support the inflated bellows.

The headrest according to the present invention offers a number of advantages. It can be installed without change of the seating installation and forms, in its use position, an inflatable cushion. The cushion supports and absorbs the head impact by its inherent stiffness, which can be additionally increased by the cover. As to the rest, the cushion folds together automatically and is forcibly covered off by the cover. The actuation of the headrest can take place manually or also can be realized automatically in the described manner.

Accordingly, it is an object of the present invention to provide a headrest for a motor vehicle which avoids by simple means the aforementioned shortcomings and drawbacks encountered in the prior art.

Another object of the present invention resides in a headrest for a motor vehicle which does not impair the visibility for the driver with an unoccupied seat, yet involves relatively low expenditures to achieve a completely satisfactory headrest when the seat is occupied.

A further object of the present invention resides in a headrest which is not only highly reliable in operation and safe for its intended purposes, but can be installed without change of the seat construction as such.

A further object of the present invention resides in a headrest which comes into existence only when a respective seat is occupied.

A still further object of the present invention resides in a headrest which is constituted by an inflatable cushion that disappears out of the vision of the driver when not required by a seated passenger.

Figure 2:
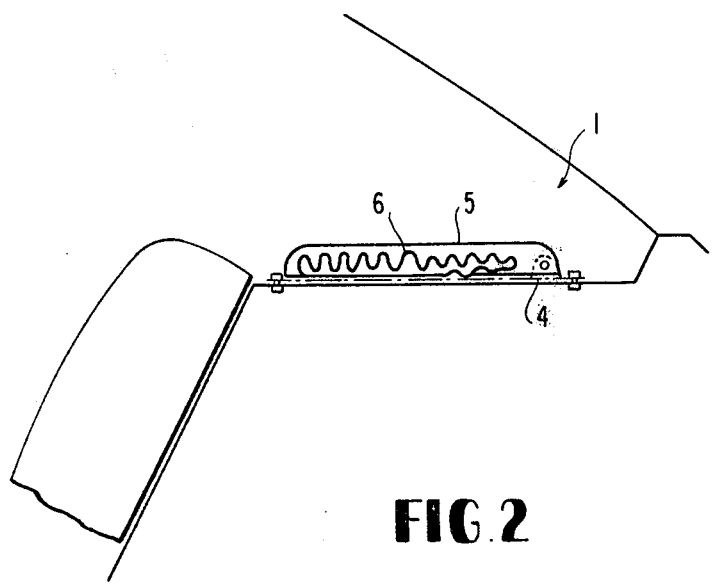

These and further objects, features and advantages of the present invention will become more apparent from the following description when taken in connection with the accompanying drawing which shows, for purposes of illustration only, one embodiment in accordance with the present invention, and wherein:

FIG. 1 is a somewhat schematic longitudinal cross-section through a rear part of a motor vehicle with an inflated headrest according to the present invention; and FIG. 2 is a partial longitudinal cross-sectional view through a part of a rear section of a motor vehicle with a folded-together headrest according to the present invention that is covered off by a cover.

Referring now to the drawing wherein like reference numerals are used throughout the two views to designate like parts, the foldable headrest is secured as a self-contained structural unit generally designated by reference numeral 1 which is installable by itself without the pressure producer 2 and the switching device 3 on the hat shelf of a passenger motor vehicle underneath the rear window. Up to three headrests may be selectively installed on the hat shelf. Additionally, correspondingly constructed headrests may also be installed at the backrests of the front seats.

The structural unit 1 which can be installed by itself consists of a base frame 4 adapted to be bolted onto the vehicle, of a cover 5, and of the foldable bellows 6. The bellows 6 is provided with elastically yielding drawbands 7 which fold the same during the removal of the internal pressure and upon further decrease of the inner pressure, fold the same completely together. After the folding together, the cover 5 assisted by a spring 8 covers the bellows 6. The installation then has the appearance as shown in FIG. 2.

A connecting line 9 is connected to the bellows 6, by means of which the air can be supplied to the bellows or again drawn out of the bellows. Furthermore, a safety valve (10) is provided, by means of which larger quantities of air can be rapidly bled or drained-off out of the bellows 6 in case of a strong, sudden head impact and therewith the spring stiffness of the air cushion can be reduced. The pressure producer 2 is driven by an electric motor (not shown) which is adapted to be turned on and off by a seat contact switch 3. If the seat 11 is occupied, then the electric motor is set into rotation by the seat contact switch 3 and is so connected by a corresponding valve that the bellows 6 is inflated. If the vehicle seat 11 is again left by the occupant, then merely a valve (not shown) of conventional construction is shifted, as a result of which the bellows 6 is sucked empty. The turning-off of the electric motor takes place in every case both during the inflation as during the deflation of the bellows by an overload switch.

In lieu of an automatic switch as described, the headrest can also be inflated or again emptied by a switch actuatable by hand. The folding together of the bellows 6 is facilitated in that elastically yielding bands 7 are secured thereto, which during the emptying of the bellows assure that the same is folded together along the provided folds.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A headrest for a motor vehicle with an inflatable bellows means which is inflated only in case of need, comprising:
    inflatable bellows means for forming the headrest itself;
    means for inflating and deflating the bellows means; and
    elastically yielding drawband means for operably returning the bellows means into its folded-together position in response to the deflating of the bellows means.

2. A headrest according to claim 1, characterized in that the means for inflating and deflating the bellows means is an air pump which is operable by a valve means.

3. A headrest according to claim 2, wherein the valve means is a four-way valve.

4. A headrest according to claim 2, further comprising:
    an electric motor means for driving the air pump; and
    a seat contact switch means for selectively turning on the electric motor means.

5. A headrest according to claim 4, further comprising:
    an overload switch means for selectively turning off the electric motor means and for simultaneously shifting said valve means.

6. A headrest according to claim 5, further comprising:
    a safety valve means for permitting the escape of a part of the air out of the bellows means in response to a sudden strong head impact.

7. A headrest according to claim 6, further comprising:
    a base frame means; and
    a cover means for covering the bellows means when said bellows means is in its folded-together position.

8. A headrest according to claim 7, further comprising:
    a spring means for bringing the cover means into its covering position.

9. A headrest according to claim 8, wherein said air pump operating valve means is a four-way valve.

* * * * *